United States Patent [19]

Engfer

[11] Patent Number: 5,711,151
[45] Date of Patent: Jan. 27, 1998

[54] BRAKE-PRESSURE MODULATION DEVICE

[75] Inventor: Ortwin Engfer, Stuttgart, Germany

[73] Assignee: Robert Bosch GmbH, Stuttgart, Germany

[21] Appl. No.: 524,404

[22] Filed: Sep. 6, 1995

[30] Foreign Application Priority Data

Oct. 5, 1994 [DE] Germany .................. 44 35 623.4

[51] Int. Cl.[6] ............................................. F15B 7/00
[52] U.S. Cl. ................... 60/545; 60/562; 60/581; 60/588; 60/591
[58] Field of Search .................. 60/562, 581, 588, 60/591, 592, 545

[56] References Cited

U.S. PATENT DOCUMENTS

| | | | |
|---|---|---|---|
| 2,060,854 | 11/1936 | Carroll | 60/581 |
| 3,109,287 | 11/1963 | Gardner | 60/562 |
| 4,091,619 | 5/1978 | Carre et al. | 60/562 |
| 4,685,301 | 8/1987 | Bacardit et al. | 60/562 |
| 4,796,958 | 1/1989 | Brown | 60/581 |

FOREIGN PATENT DOCUMENTS

| | | | |
|---|---|---|---|
| 0366966 | 5/1990 | European Pat. Off. | |
| 2459746 | 2/1981 | France | 60/562 |
| 0168286 | 1/1986 | France | |
| 157876 | 2/1940 | Germany | 60/588 |
| 3609974 | 10/1986 | Germany | |
| 4020448 | 1/1992 | Germany | |
| 2266752 | 11/1993 | United Kingdom | 60/562 |

*Primary Examiner*—R. Daniel Lopez
*Attorney, Agent, or Firm*—Edwin E. Greigg; Ronald E. Greigg

[57] ABSTRACT

A brake-pressure modulation device in which a hydraulic unit, fitted with solenoid valves, with return pumps, accumulators and dampers of an anti-lock brake system also has a tandem brake master cylinder. The hydraulic unit has a housing with a standard location hole, into which four lip seals identical at least in their outside diameters are inserted. The lip seals hold a primary and a secondary piston of the tandem brake master cylinder. The use of four lip seals with the same outside diameter makes it possible to use the same housing with the standard location hole for different types of vehicle, even when the piston diameter and the operating stroke are changed.

19 Claims, 4 Drawing Sheets

BRAKE-PRESSURE MODULATION DEVICE

PRIOR ART

The invention relates to a brake-pressure modulation device as set forth herein. Such brake-pressure modulation devices are known from DE 36 0 974 C2 and U.S. Pat. No. 4,998,781.

Brake-pressure modulation devices of this kind are used in brake systems of vehicles which are fitted with an anti-lock brake system (ABS) and/or with a traction-control system (ASR). In such brake-pressure modulation devices, solenoid valves monitor the pressure in the brake lines leading to the wheel-brake cylinders, and return pumps and low-pressure accumulators for example are used to return excess brake fluid in wheel-brake cylinders to the brake master cylinder. An electronic control unit supplies control signals for corresponding control of the solenoid valves.

The solenoid valves, the return pumps and the low-pressure accumulators are, for example, combined and arranged in a hydraulic unit to which the brake master cylinder—generally in combination with a brake booster—is flanged.

Moves towards further integration and standardization gave rise to the object, in connection with such devices, of installing the brake master cylinder in the hydraulic unit as well. There was the difficulty here of having to accommodate different sizes of master cylinder since master cylinders of different diameters, of between 19 and 28 mm for example, and different operating strokes are quite possible for different types of vehicle. It was therefore necessary for all variants to make location holes of different configurations in the hydraulic unit for the brake master cylinder. The object arose of avoiding different location holes.

This object is achieved, starting from a brake-pressure modulation device of the type stated at the outset, by means set forth herein.

Further advantageous features of the invention will become obvious and from the description and drawing.

BRIEF DESCRIPTION OF THE DRAWINGS

An exemplary embodiment of the invention is illustrated in the drawings and explained in greater detail in the description which follows. In the drawing.

DETAILED DESCRIPTION OF THE EXEMPLARY EMBODIMENT

Figure 1:
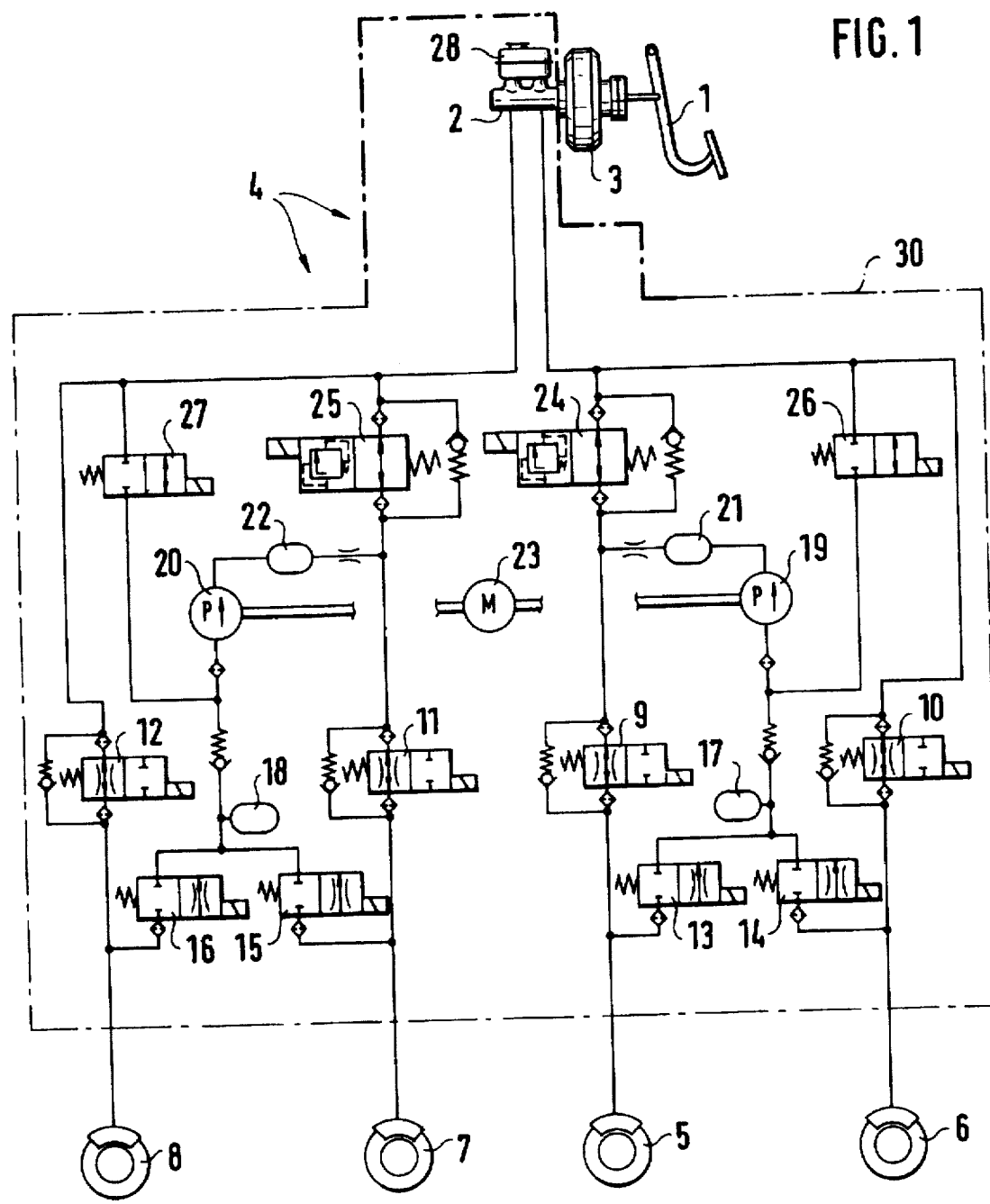
FIG. 1 shows a hydraulic circuit diagram of the brake-pressure modulation device with an integrated brake master cylinder.

FIG. 1 shows a brake-pressure modulation device in a brake system of a motor vehicle. A brake master cylinder 2 that can be actuated by means of a pedal 1 and connected to booster 3 can be seen. The brake master cylinder 2 is integrated with the brake-pressure modulation device in a hydraulic unit 4 in which a number of elements which influence a hydraulic flow is provided. Since it is designed as a dual-circuit tandem master cylinder, there are two outlets on the brake master cylinder 2, namely a primary circuit I and a secondary circuit II with the brake circuits being split diagonally between the wheel brakes 5, 6, 7 and 8, i.e. a "K" split. In each brake circuit, an inlet solenoid valve 9, 10, 11, 12 and an outlet solenoid valve 13, 14, 15, 16, by means of which anti-lock operation can be carried out, are provided in each brake circuit for each wheel brake 5, 6, 7 and 8. The brake-pressure modulation device also includes, for each circuit, a low-pressure accumulator 17 and 18 respectively, a return pump 19 and 20 respectively, a damper 21 and 22 respectively, and an electric motor 23 for driving the two return pumps 19 and 20. An electronic control unit is also employed although this is not illustrated in FIG. 1.

Figure 2:
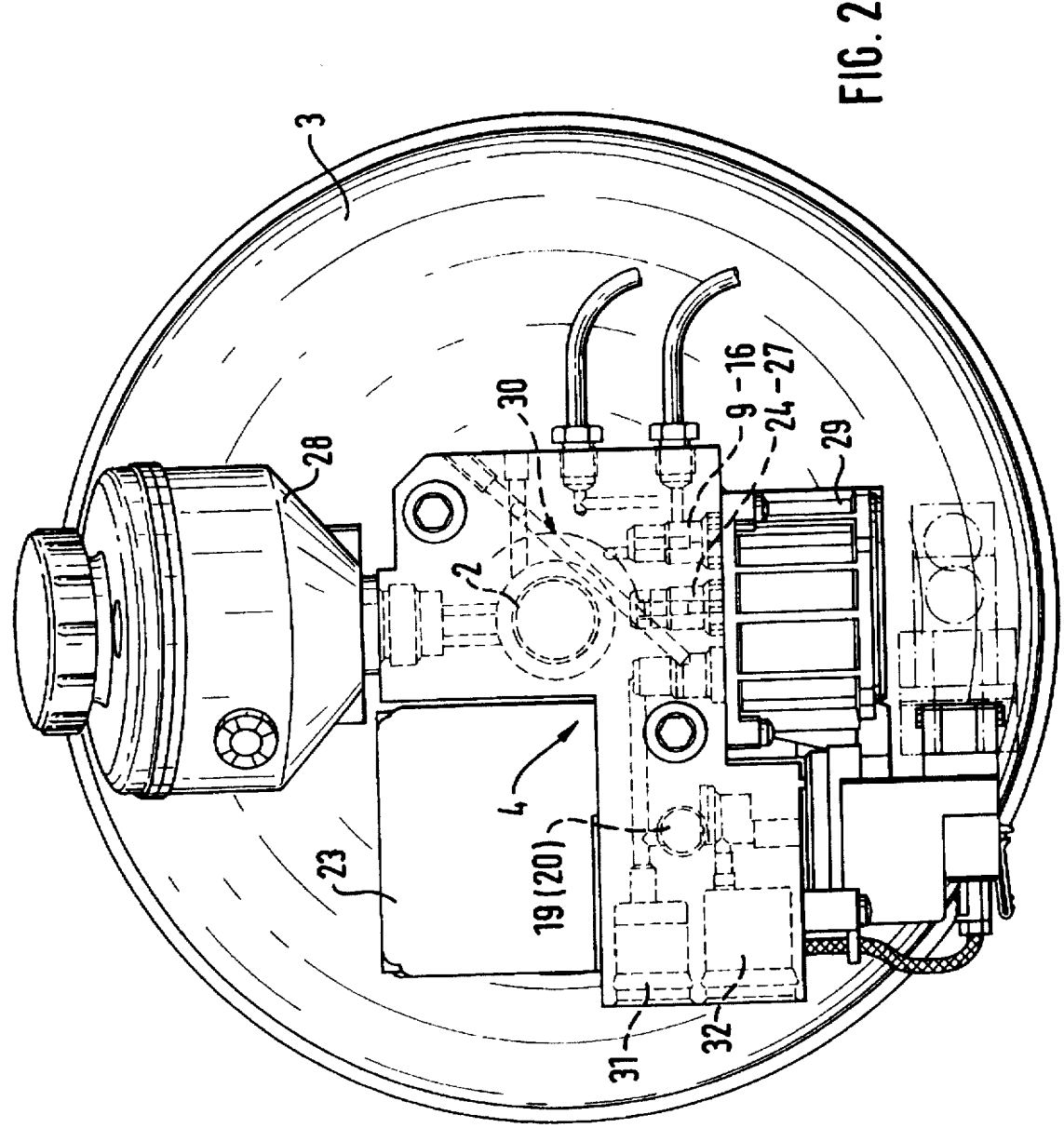
FIG. 2 shows the brake-pressure modulation device in a front elevation with a reservoir attached and a booster flanged to it.

For traction control, each circuit contains a changeover valve 24 and 25 respectively and a shut-off valve 26 and 27 respectively, the operation of which is likewise monitored by the control unit. The hydraulic unit 4 has a single, compact housing 30, which is outlined in chain lines in FIG. 1 and is emphasized with a bold line in FIG. 2. The latter also shows a reservoir 28, seated on the integrated brake master cylinder 2, and an electronic control unit 29, and projecting into the latter are the solenoid valves 9 to 16 and 24 to 27, which—as will be explained later—are inserted from below into the housing 30 of the hydraulic unit 4.

Under the electric motor 23 serving to drive the two return pumps 19 and 20, two chambers 31 and 32 can be seen, one of these belonging to the dampers 21 and 22 and the other to the accumulators 17 and 18. The two return pumps 19 and 20 can also be seen in outline.

Figure 3:
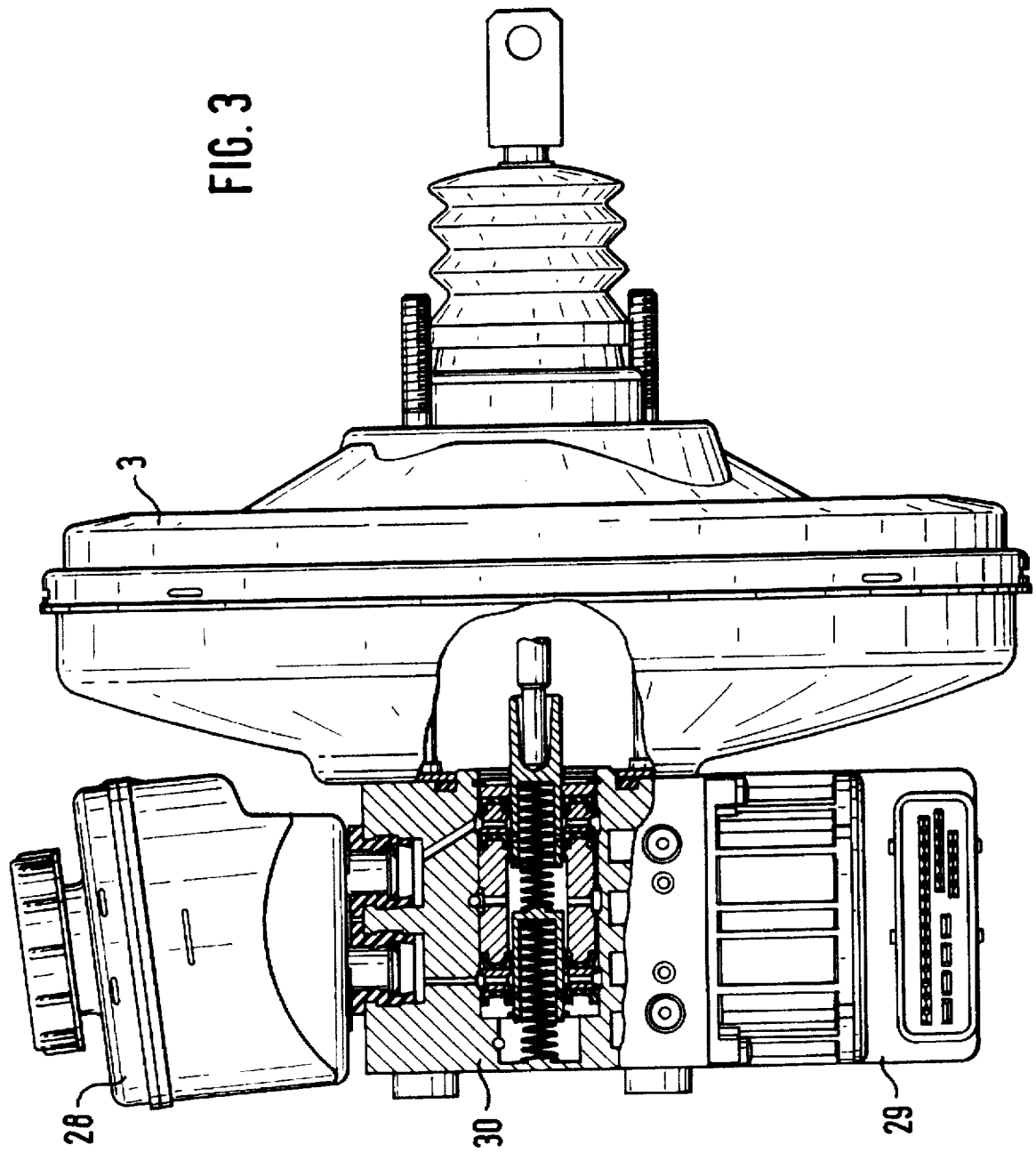
FIG. 3 shows the brake-pressure modulation device of FIG. 2 in side view; in partial longitudinal section.

FIG. 3 shows the brake master cylinder 2 in the housing 30 between the booster 3, the reservoir 28 and the electronic control unit 29.

In the integration of the brake master cylinder 2 into the housing 30 of the hydraulic unit 4, different effective diameters and operating strokes of pistons are achieved for different types of vehicle in a manner essential to the invention.

Figure 4:
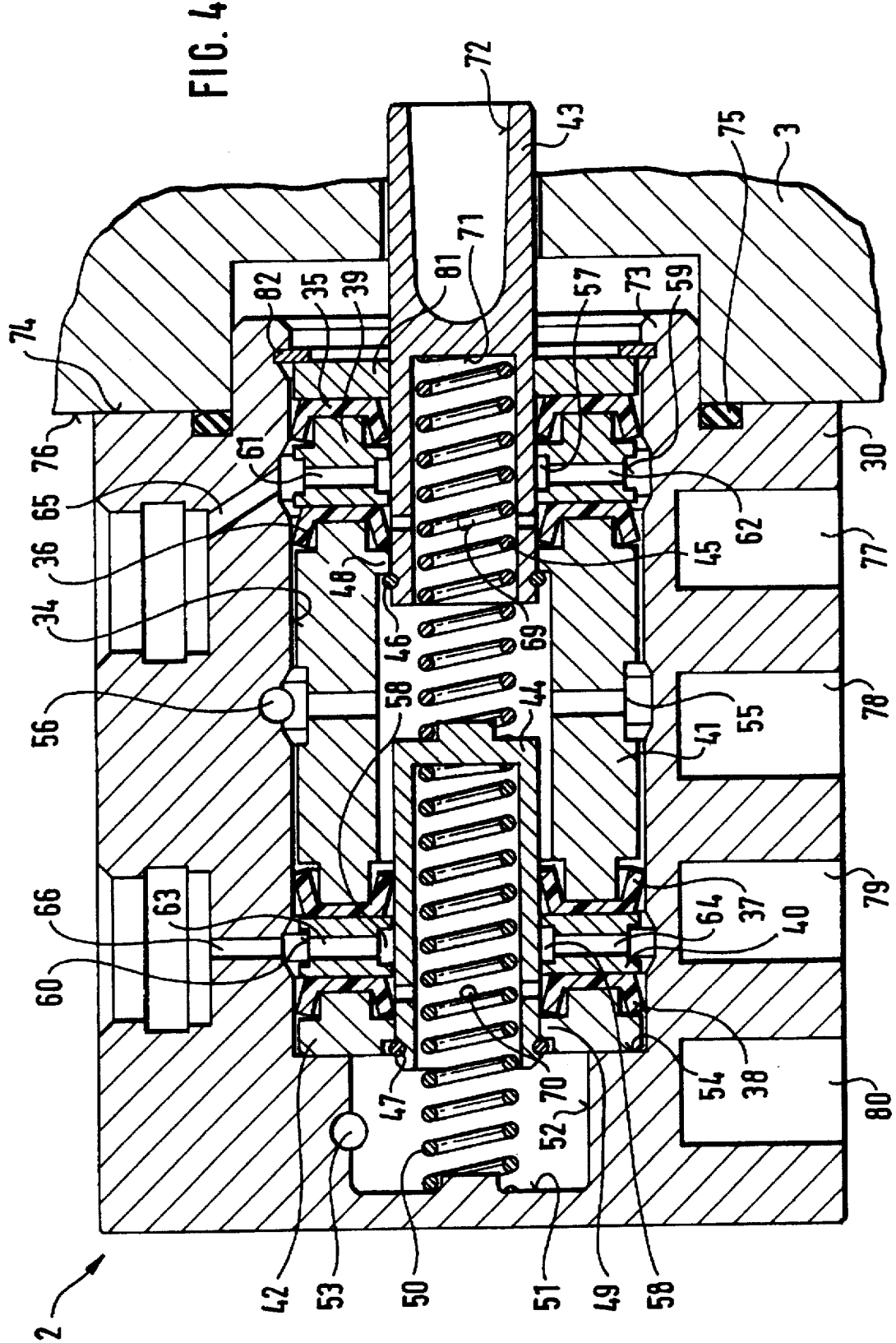
FIG. 4 shows the brake master cylinder on an enlarged scale in longitudinal section.

As the longitudinal section in FIG. 4 shows, the housing 30 according to the invention of the hydraulic unit 4 has a cylindrical location bore 34, which is designed as a standard bore. This location bore 34 accommodates four identical lip seals 35, 36, 37 and 38. The lip seals 35 to 38 are held immobile in the housing by intermediate rings. The intermediate rings are designed as two distance rings 39 and 40, a distance bush 41 and a stop ring 42. One distance ring 39, 40 lies between each pair of lip seals 35, 36 and 37, 38 respectively. One pair 35, 36, that at the pedal end, is arranged in such a way that sealing lips point in the same direction, namely into the brake master cylinder. This pair 35, 36 receives a primary piston 43. In the case of the other pair 37, 38, the sealing lips point in opposite directions, i.e. they point away from one another. This pair 37, 38 receives a secondary piston 44. Both pistons 43 and 44 lie coaxially in series and are pushed apart by a helical compression spring 45.

The pistons 43 and 44 have cylindrical circumferential surfaces and, in their forward area, they each have an axial stop formed by snap rings 46 and 47 let into the circumferential surface. The snap ring 46 of the primary piston 43 is intended to interact with an internal annular shoulder 48 on the distance bush 41 and the snap ring 47 of the secondary piston 44 has a stop on an internal annular shoulder 49 of the stop ring 42. Inserted into the secondary piston 44 is a return spring 50 which is supported against a bottom wall 51 of a pocket hole 52. This pocket hole 52 has a connection 53 which is assigned to the wheel brakes 7 and 8 of the secondary circuit. Between the location hole 34 and the pocket hole 52 there is a shoulder 54, which is a bearing surface for the stop ring 42, which is thus a starting-position stop for the secondary piston 44 provided with the snap ring 47.

An annular groove 55 is formed in the distance bush 41 approximately half way along its length, this annular groove communicating with a connection 56 for a brake line leading to the wheel brakes 5 and 6 of the primary circuit.

The two distance rings 39 and 40 which hold the lip seals of pairs 35, 36 and 37, 38 spaced apart each have an inner groove 57 and 58 respectively and an outer annular groove 59 and 60 respectively and the inner and outer annular grooves 57, 59 and 58, 60 respectively are in each case connected to one another by radial passages 61, 62 and 63, 64 respectively. A continuous hydraulic connection of housing holes 65 and 66 to the pistons 43 and 44 respectively is in this way established. The housing holes 65, 66 are connected to the two-chamber reservoir 28.

Each piston 43 and 44 is provided with at least one refill hole 69 and 70, respectively, penetrating its piston wall radially, and this refill hole 69, 70 lies just behind the inner lip seal of the respective front lip seal 36, 38 in the starting position of the plunger pistons 43 and 44. At one end, its inner end, the primary piston 43 has a recess 71 for the helical compression spring 45 and, at its other end, has a recess 72 for an actuating rod (illustrated in FIG. 3) of the brake booster 3, and both recesses 71 and 72 are arranged coaxially with respect to the piston 43.

The location bore 34 intended for the lip seals 35 to 38 in the master-cylinder housing has a radial housing flange 74 which surrounds a mouth 73 of the hole and let into which is a ring seal 75. The housing flange 74 and the ring seal 75 allow the housing 30 to be flanged leaktightly to a housing 76 of the brake booster 3. Also provided in the master-cylinder housing 30, at the bottom, are a plurality of pocket holes 77, 78, 79, 80 which point in the same direction and are intended to accommodate the solenoid valves 9 to 16 and 24 to 27.

During the assembly of the brake master cylinder 2, the secondary piston 44 together with the stop ring 42 and the return spring 50 are first of all inserted into the location bore 34 in the housing 30. They are followed by the two lip seals 37 and 38 together with the distance ring 40. Then come the helical compression spring 45 and the distance bush 41 together with the primary piston 43. Finally, the two lip seals 35 and 36 are installed together with their distance ring 39. All these installed parts are then screened off from the outside by an annular washer 81, which is penetrated only by the operating end of the primary piston 43. A ring 82 snapped into the location hole 34 holds the annular washer 81 fast.

The four lip seals 35 to 38 shown in FIG. 4 can have different inside diameters while retaining the same outside diameters, in order to accommodate pistons with different outside diameters. It is thus possible, for example, to employ pistons with conventional piston diameters of between 17 and 28 mm without the need to change the outside diameters of the lip seals and the diameter of the location hole 34. Holding in stock sets of seals each comprising four matched lip seals is unproblematic and economical. It is also possible to change the respectively required piston strokes in the brake master cylinder 2 by employing pistons of different length.

Finally, it is also possible according to the invention to produce a "stepped" brake master cylinder by changing the inside diameters of one pair 35, 36 of lip seals relative to those of the other pair 37, 38 while again retaining the same outside diameters for the lip seals 35 to 38. It would then be possible, for example, for the primary piston to have a diameter of 28 mm and for the secondary piston to have a diameter of 22 mm.

MODE OF OPERATION

When the primary piston 43 is actuated, the snifter hole 69 crosses the sealing lip of lip seal 36. Pressure builds up in the primary circuit. The secondary piston 44 likewise starts to move. The snifter hole 70 of the secondary piston 44 crosses the sealing lip of lip seal 38. The same pressure builds up in the secondary circuit. To release the brakes, the two pistons 43 and 44 are returned by the pressure and by the force of the two springs 45 and 50.

When the snifter holes 69 and 70 cross the lip seals 36 and 38 respectively, the pressure forces the sealing lip of the respective lip seals 36 and 38 away from an edge of the associated snifter hole 69, 70. Damage to the sealing lip of the lip seals 36 and 38 is thereby avoided.

According to the invention, different effective diameters and strokes of the brake master cylinder 2 are thus achieved by means of the choice of piston diameters. In the process, only the inside diameter of the lip seals 35, 36, 37, 38 is changed while the outside diameter remains the same in all cases.

In a refinement according to the invention of the brake master cylinder 2 with two pistons of the same diameter, four lip seals 35, 36, 37, 38 of identical construction are required. Fine machining with different diameters is not required in the housing 30 of the brake master cylinder 2 since the lip seals rest in the location hole 34 and always have the same outside diameter.

Fine machining is required only on the two pistons 43 and 44. Fine machining of piston faces is more economical to carry out than fine machining of the location hole 34.

The short construction of the brake master cylinder 2 facilitates its integration into the hydraulic unit 4. Only a small amount of space is required for the installation of the hydraulic unit 4. The compact design of the brake master cylinder 2 also makes it possible to manufacture the housing 30 from a casting or an extruded profile.

The foregoing relates to preferred exemplary embodiments of the invention, it being understood that other variants and embodiments thereof are possible within the spirit and scope of the invention, the latter being defined by the appended claims.

I claim:

1. A brake-pressure modulation device for a brake system of a motor vehicle having primary and secondary brake circuits, comprising, a hydraulic unit fitted with solenoid valves for brake-pressure modulations, a housing (30), said housing including a cylindrical location bore (34), a tandem brake master cylinder that includes a primary piston (43) and a secondary piston (44) within said housing with said secondary piston in axial alignment with said primary piston, first and second distance rings (39, 40) in said location bore, said first and second distance rings surround said first and second piston respectively, a first pair of lip seals (35 and 36) on opposite sides of said first distance ring, a second pair of lip seals (37 and 38) on opposite sides of said second distance ring, a distance bush 41 surrounds at least a portion of each of said first and second pistons and is installed as a spacer between lip seals (36 and 37), said distance bush (41) includes therein annular groove (55) which joins an axial passage in said distance bush, to which a connection (56) for wheel-brake cylinders (5, 6) of the primary circuit is provided approximately half way along said distance bush (41), said first and second pair of lip seals have the same outside diameter and make contact with an inner surface of said bore, and the lip seals rest leak-tight on said first and second pistons of the brake master cylinder, said first pair of lip seals (35, 36) are for said primary piston, and said second pair of lip seals (37, 38) are for said secondary piston.

2. The pressure modulation device as claimed in claim 1, wherein the first pair of lip seals (35, 36) for the primary piston (43) is installed with the sealing lips facing in a same direction.

3. The pressure modulation device as claimed in claim 1, wherein the second pair of lip seals (37, 38) for the secondary piston (44) is installed with the sealing lips in opposite directions, with rear sides of the lip seals facing one another.

4. The pressure modulation device as claimed in claim 1, wherein each said first and second distance ring (39 and 40), respectively, has an inner annular groove (57 and 58), respectively, and an outer annular groove (59 and 60), respectively, and wherein said inner and outer annular grooves (57, 59 and 58, 60) respectively, are connected to one another by a radial passage (61, 62, 63, 64).

5. The brake-pressure modulation device as claimed in claim 1, wherein a helical compression spring (45) is arranged between the primary piston (43) and the secondary piston (44), and wherein a starting-position stop (46/48) for the primary piston (43) is formed by an internal annular shoulder (48) on the distance bush (41).

6. The brake-pressure modulation device as claimed in claim 5, wherein the secondary piston (44) is additionally assigned a return spring (50) which is supported by a bottom wall (51) of a pocket hole (52) arranged coaxially with respect to the location bore (34) in the housing (30).

7. The brake-pressure modulation device as claimed in claim 6, wherein the pocket hole (52) has a connection (53) which is assigned to the wheel-brake cylinders (7, 8) of the secondary brake circuit.

8. The brake-pressure modulation device as claimed in claim 7, wherein each primary and secondary piston (43, 44) has an annular groove and wherein respective snap rings (46 and 47) projecting above a respective circumferential surface of the primary and secondary piston (43) and (44) respectively are inserted into each annular groove.

9. The brake-pressure modulation device as claimed in claim 6, wherein a shoulder (54) is provided between the location bore (34) and the pocket hole (52), forming a bearing surface for a stop ring (42), which is a starting-position stop for the secondary piston (44).

10. The brake-pressure modulation device as claimed in claim 9, wherein a pocket hole serving to accommodate a respective spring (45 and 50) in each piston (43, 44) is provided with at least one refill hole (69, 70) passing radially through a wall of each piston.

11. The brake-pressure modulation device as claimed in claim 5, wherein, at one end, the primary piston (43) has a recess (71) for the helical compression spring (45).

12. The brake-pressure modulation device as claimed in claim 1, wherein the housing (30) has a radial housing flange (74) which surrounds a mouth (73) of the location bore, a ring seal (75), surrounds said mouth, and wherein the housing flange (74) and the ring seal (75) are intended to allow the housing (30) having the tandem master cylinder to be flanged leaktightly to a brake booster (31).

13. The brake-pressure modulation device as claimed in claim 1, wherein a plurality of pocket holes (77, 78, 79, 80) are provided in the housing (30) of the tandem brake master cylinder (2) to accommodate a plurality of solenoid valves (9 to 16; 24 to 27).

14. The brake-pressure modulation device as claimed in claim 13, wherein the pocket holes (77, 78, 79, 80) are aligned at least substantially in the same direction.

15. The brake-pressure modulation device as claimed in claim 1, wherein an annular groove is in each case machined into the wall of the location bore (34) opposite an outer annular groove (59, 60) in the distance rings (39, 40) and wherein this annular groove is connected to a connecting stub for a reservoir (38) by a housing passage (65, 66).

16. The brake-pressure modulation device as claimed in claim 15, wherein, after the insertion of the two pistons (43 and 44), the springs (45 and 50) and the stop ring (42) and, furthermore, of the four lip seals (35, 36, 37, 38) together with their distance rings (39 and 40) and said spacer bush (41), the cylindrical location bore (34) in the housing (30) is screened off from the outside with the aid of an annular washer (81) which is held by a snap ring (82) inserted into the location bore (34).

17. The brake-pressure modulation device as claimed in claim 1, wherein, while an outside diameter of each of the four lip seals (35, 36, 37, 38) are the same, an inside diameters of said first and second pairs of lip seals are different to make the tandem brake master cylinder a stepped brake master cylinder.

18. The brake-pressure modulation device as claimed in claim 17, wherein the inside diameters of the second pair of lip seals (37 and 38) for the secondary piston (44) are smaller than the inside diameters of the first pair of lip seals (35 and 36) for the primary piston (43).

19. The brake-pressure modulation device as claimed in claim 1, wherein two return pumps (19, 20) driven by a motor (23), and a plurality of accumulators (17, 18) and dampers (21, 22) are arranged in the hydraulic unit (4) in addition to the tandem brake master cylinder (2).

* * * * *